United States Patent
Fujiwara et al.

(10) Patent No.: US 12,445,197 B2
(45) Date of Patent: Oct. 14, 2025

(54) OPTICAL TRANSMITTER, OPTICAL ACCESS SYSTEM, AND OPTICAL TRANSMISSION METHOD

(71) Applicant: NTT, Inc., Tokyo (JP)

(72) Inventors: Masamichi Fujiwara, Musashino (JP); Takuya Kanai, Musashino (JP)

(73) Assignee: NTT, Inc., Tokyo (JP)

( * ) Notice: Subject to any disclaimer, the term of this patent is extended or adjusted under 35 U.S.C. 154(b) by 124 days.

(21) Appl. No.: 18/022,914

(22) PCT Filed: Aug. 31, 2020

(86) PCT No.: PCT/JP2020/032951
§ 371 (c)(1),
(2) Date: Feb. 23, 2023

(87) PCT Pub. No.: WO2022/044337
PCT Pub. Date: Mar. 3, 2022

(65) Prior Publication Data
US 2023/0308175 A1    Sep. 28, 2023

(51) Int. Cl.
*H04B 10/077* (2013.01)
*H04B 10/50* (2013.01)
(Continued)

(52) U.S. Cl.
CPC ......... *H04B 10/077* (2013.01); *H04B 10/503* (2013.01); *H04B 10/516* (2013.01); *H04J 14/02* (2013.01)

(58) Field of Classification Search
CPC .. H04B 10/077; H04B 10/503; H04B 10/516; H04J 14/02
See application file for complete search history.

(56) References Cited

U.S. PATENT DOCUMENTS 5,920,414 A * 7/1999 Miyachi ............... H04B 10/506 398/91
6,233,261 B1 * 5/2001 Mesh ................... H04B 10/506 372/20

(Continued)

FOREIGN PATENT DOCUMENTS

JP    H10126341    5/1998
JP    H10170740    6/1998
(Continued)

OTHER PUBLICATIONS

Nakagawa et al., "Proposal and Characteristics Evaluation of Compact and Low Cost AMCC Superimposition with Magneto-Optic VOA," IEICE Technical Report CS2018-7, Apr. 2018, 6 pages (English Abstract).

(Continued)

*Primary Examiner* — Pranesh K Barua
(74) *Attorney, Agent, or Firm* — Fish & Richardson P.C.

(57) ABSTRACT

An optical transmitting device includes a plurality of optical transmitting units that output optical signals with different wavelengths, a multiplexer that wavelength-multiplexes the plurality of the optical signals output from the plurality of optical transmitting units, and an amplifying unit that amplifies the wavelength-multiplexed optical signal, in which the plurality of optical transmitting units include a monitoring control signal application unit that adds a monitoring control signal to a constant current for driving a laser to generate a driving signal and applies the driving signal to the laser, a laser that outputs an optical signal in accordance with the driving signal applied to the monitoring control signal application unit, and a modulator that modulates the optical signal output from the laser with a main signal.

8 Claims, 8 Drawing Sheets

(51) Int. Cl.
*H04B 10/516* (2013.01)
*H04J 14/02* (2006.01)

(56) References Cited

U.S. PATENT DOCUMENTS

| | | | | |
|---|---|---|---|---|
| 7,260,332 | B1* | 8/2007 | Hayee | H04B 10/505 398/154 |
| 8,611,747 | B1* | 12/2013 | Wach | H04J 14/04 398/79 |
| 9,455,782 | B2* | 9/2016 | Zheng | H04B 10/572 |
| 2003/0165286 | A1* | 9/2003 | Ikushima | H04B 10/00 385/24 |
| 2006/0024066 | A1* | 2/2006 | Fujiwara | H04B 10/2587 359/344 |
| 2009/0324256 | A1 | 12/2009 | Kuzukami et al. | |
| 2010/0189445 | A1 | 7/2010 | Nakashima et al. | |
| 2012/0263472 | A1* | 10/2012 | Wu | H04B 10/2563 398/43 |
| 2012/0318965 | A1* | 12/2012 | Tosaki | H04B 10/0773 250/227.11 |
| 2016/0308664 | A1* | 10/2016 | Ishaug | H04B 10/5051 |

FOREIGN PATENT DOCUMENTS

| | | |
|---|---|---|
| JP | 2000068601 | 3/2000 |
| JP | 2005520323 A | 7/2005 |
| JP | 2010011098 | 1/2010 |
| JP | 2010178090 | 8/2010 |
| WO | WO 2003076979 A2 | 9/2003 |
| WO | WO 2004113998 A1 | 12/2004 |

OTHER PUBLICATIONS

Sone et al., "Demonstration of Simultaneous Multiple ONUs Activation in WDM-PON System for 5G Mobile Fronthaul," IEICE Technical Report CS2018-94, OSC2018-74, Jan. 2019, 4 pages (English Abstract).

Yoshima et al., "Experimental Investigation of an Optically-superimposed AMCC in 100 GB/s Coherent WDM-PON for 5G Mobile Fronthaul," ECOC, 2016, 3 pages.

* cited by examiner

OPTICAL TRANSMITTER, OPTICAL ACCESS SYSTEM, AND OPTICAL TRANSMISSION METHOD

CROSS-REFERENCE TO RELATED APPLICATIONS

This application is a National Stage application under 35 U.S.C. § 371 of International Application No. PCT/JP2020/032951, having an International Filing Date of Aug. 31, 2020.

The disclosure of the prior application is considered part of the disclosure of this application, and is incorporated by reference in its entirety into this application.

TECHNICAL FIELD

The present invention relates to an optical transmitter, an optical access system, and an optical transmission method.

BACKGROUND ART

In an optical access system, an optical access system using a wavelength division multiplexing (WDM) technique has been proposed (for example, refer to NPL 1 to NPL 3).

FIG. 7 a diagram illustrating a configuration example of the conventional optical access system 1000 (No. 1). In the optical access system 1000, a WDM signal in which a monitoring control signal defined by an auxiliary management and control channel (AMCC) is superimposed for each wavelength is transmitted and received in an upstream direction and a downstream direction.

The optical access system 1000 includes an optical line terminal (OLT) 100 and a plurality of optical network units (ONUs) 200-1 to 200-N (N is an integer of 2 or more). The OLT 100 and the ONU 200-1 to 200-N are communicatively connected via an optical fiber 250 and an optical splitter 260. The OLT 100 includes N optical transmitting units 110-1 to 110-N, a wavelength multiplexer 120, a WDM filter 130, a wavelength demultiplexer 140, and N optical receiving units 150-1 to 150-N. The system configuration of the optical access system 1000 is, for example, an example of a configuration of a time wavelength division multiplexing-passive optical network (TWDM-PON) system defined in the ITU-T G.989.2 series.

The optical transmitting units 110-1 to 110-N generate optical signals having different wavelengths from each other. Each wavelength is amplitude-modulated by an electric signal generated by adding a weak monitoring control signal to transmission data (binary on/off signal). Each of the optical transmitting units 110-1 to 110-N includes addition units 111-1 to 111-N, and optical transmitters 112-1 to 112-N. The addition units 111-1 to 111-N add the input transmission data and the monitoring control signal superimposed on the subcarrier. Here, the monitoring control signal superimposed on the subcarrier is used for the purpose of coping with an AC coupling type optical receiver.

The optical transmitters 112-1 to 112-N generate optical signals having different wavelengths by amplitude-modulating the electric signals added by the addition units 111-1 to 111-N. The optical signal generated in this manner has a monitoring control signal superimposed on the main signal. The optical signals generated by the optical transmitters 112-1 to 112-N are multiplexed by the wavelength multiplexer 120 to become a downstream WDM signal. The downstream WDM signal is transmitted to the ONUs 200-1 to 200-N via the WDM filter 130, the optical fiber 250, and the optical splitter 260.

The WDM filter 130 multiplexes light beams having different wavelengths and demultiplexes an input optical signal. The optical signal demultiplexed by the WDM filter 130 is input to the wavelength demultiplexer 140.

The wavelength demultiplexer 140 divides the input optical signal into light of each wavelength and outputs the signal. The wavelength demultiplexer 140 has a plurality of ports for outputting light beams having different wavelengths, and each port is connected with optical receiving units 150-1 to 150-N.

The optical receiving units 150-1 to 150-N extract transmission data and a monitoring control signal superimposed on a subcarrier from the optical signal input to the OLT 100. Each of the optical receiving units 150-1 to 150-N includes optical receivers 151-1 to 151-N and branching devices 152-1 to 152-N. The optical receivers 151-1 to 151-N detect the input optical signal and convert the optical signal into an electric signal. The branching devices 152-1 to 152-N branch the electric signal. Then, in a post-stage processing unit, transmission data is acquired from one branched part, and a monitoring control signal superimposed on a subcarrier is acquired from the other branched part.

The ONUs 200-1 to 200-N include WDM filters 210-1 to 210-N, optical transmitting units 220-1 to 220-N, and optical receiving units 230-1 to 230-N. Since the ONUs 200-1 to 200-N have the same configuration, a specific configuration will be described using the ONU 200-1 as an example. The WDM filter 210-1 multiplexes light beams having different wavelengths and demultiplexes an input optical signal. The optical signal demultiplexed by the WDM filter 210-1 is input to the optical receiving unit 230-1.

The optical transmitting unit 220-1 generates an optical signal having a wavelength set in the ONU 200-1. The optical transmitter 220-1 includes an addition unit 221-1 and a wavelength variable optical transmitter 222-1, respectively. The addition unit 221-1 adds the transmission data input to the ONU 200-1 and the monitoring control signal superimposed on the subcarrier.

The wavelength variable optical transmitter 222-1 generates an optical signal having a wavelength set in the ONU 200-1 by amplitude-modulating the electric signal added by the addition unit 221-1. The optical signals generated by each of the ONUs 200-1 to 200-N are multiplexed by the optical splitter 260 to become an upstream WDM signal. The upstream WDM signal is transmitted to the OLT 100 via an optical splitter 260 and an optical fiber 250.

The optical receiving unit 230-1 extracts the transmission data and the monitoring control signal superimposed on the subcarrier from the input optical signal. The optical receiving unit 230-1 includes a wavelength variable optical receiver 231-1 and a branching device 232-1. The wavelength variable optical receiver 231-1 is equipped with a wavelength variable optical filter, and when the ONU 200-1 is connected to the system, its transmitted wavelength is swept. When detecting the downstream wavelength, the ONU 200-1 reads free wavelength information of a pair of the upstream and downstream directions embedded in the monitoring control signal, and sets a transmission wavelength of the wavelength variable optical filter and an output wavelength of the wavelength variable optical transmitter 222-1 to a free wavelength (for example, See NPL 1). FIG. 7 illustrates an example in which the ONU 200-1 selects a wavelength pair of $\lambda_{d1}+\lambda_{u1}$, but the ONU 200-1 may select any wavelength pair from $\lambda_{d1}+\lambda_{u1}$ to $\lambda_{dN}+\lambda_{uN}$ if there is a free wavelength.

The wavelength variable optical receiver 231-1 converts the optical signal of the set wavelength into an electric signal. The branching device 232-1 branches the electric signal. Then, in the post-stage processing unit, transmission data is acquired from one branched part, and the monitoring control signal superimposed on the subcarrier is acquired from the other branched part. The monitoring control signal is also superimposed on the upstream optical signal, and an Ack is returned to the OLT 100.

FIG. 8 is a diagram illustrating a configuration example of the conventional optical access system 2000 (No. 2). In the optical access system 1000, the monitoring control signal is collectively superimposed on the downstream WDM signal. The optical access system 2000 includes an OLT 300 and a plurality of ONUs 400-1 to 400-N. The OLT 300 and the ONUs 400-1 to 400-N are connected via an optical fiber 450 and an optical splitter 460.

The OLT 100 includes N coherent optical transmitters 310-1 to 310-N, a wavelength multiplexer 320, and a semiconductor optical amplifier 330. The N coherent optical transmitters 310-1 to 310-N and the wavelength multiplexer 320 and the semiconductor optical amplifier 330 function as wavelength multiplex transmitters.

The N coherent optical transmitters 310-1 to 310-N generate optical signals having different wavelengths on which the main signals are superimposed. These optical signals are multiplexed by the wavelength multiplexer 320 to generate the downstream WDM signal. The semiconductor optical amplifier 330 is used to amplify the intensity of the WDM signal incident on the transmission path, and modulates the driving current with a weak monitoring control signal to superimpose the monitoring control signals on the intensity of the WDM signal collectively. The monitoring control signal of the baseband may be subcarrier-modulated, or the baseband signal may be left as it is as in the case of NPL 3.

The ONUs 400-1 to 400-N include optical branching devices 410-1 to 410-N, coherent optical receivers 420-1 to 420-N, photoelectric converters 430-1 to 430-N, and AMCC demodulators 440-1 to 440-N. Since the ONUs 400-1 to 400-N have the same configuration, a specific configuration will be described using the ONU 400-1 as an example.

The optical branching device 410 branches the downstream WDM signal input to the ONU 400-1. A part of the downstream WDM signal branched by the optical branching device 410-1 is input to the coherent optical receiver 420-1. The coherent optical receiver 420-1 coherently receives a desired optical signal by matching the wavelength of the local oscillation light to the wavelength of the received WDM signal. As the coherent detection method, intra-heterodyne detection or heterodyne detection can be used.

The other downstream WDM signal branched by the optical branching device 410-1 is input to the photoelectric converter 430-1. The photoelectric converter 430-1 converts the input downstream WDM signal into an electric signal. The AMCC demodulator 440-1 demodulates the electric signal to receive the monitoring control signal. Although all the downstream WDM signals are input to the photoelectric converter 430-1, the monitoring control signal can be received as long as the transmission bit rate of the monitoring control signal is sufficiently lower than the transmission bit rate of the main signal.

CITATION LIST

Non Patent Literature

[NPL 1] Kyosuke SONE, Goji NAKAGAWA, Yoshiro HIROSE, and Takeshi HOSHIDA, "Demonstration of Simultaneous Multiple ONUs Activation in WDM-PON System for 5G Mobile Fronthaul," Academic technical report, CS2018-7, 2018

[NPL 2] Tsuyoshi NAKAGAWA, Kyosuke SONE, Setsuo YOSHIDA, Shoichiro ODA, Motoyuki TAKIZAWA, Tomio TAKAHARA, Yoshio HIROSE, and Tsuyoshi HOSHIDA, "Proposal and characteristic evaluation of compact and low-cost AMCC superimposition method using magneto-optical effect type optical attenuator," Academic technical report, CS2018-94, 2019

[NPL 3] Satoshi Yoshima, Takaaki Katsumata, Hiroshi Miura, Yuita Noguchi, Akiko Nagasawa, Naoki Suzuki, and Masaki Noda, "Experimental Investigation of an Optically-superimposed AMCC in 100 Gb/s Coherent WDM-PON for 5G Mobile Fronthaul," ECOC2016, Th.1.D.1, 2016.

SUMMARY OF INVENTION

Technical Problem

In the conventional optical access system 1000 illustrated in FIG. 7, each wavelength is modulated by the electric signal generated by adding the monitoring control signal to transmission data to generate the downstream optical signal. In the case where the transmission data is a high-speed signal exceeding 10 Gbps, it is necessary to perform modulation by using an external modulator (an Electro-Absorption (EA) modulator or a lithium niobate (LN) modulator). However, when a part of the amplitude range of the electric signal for driving the modulator is allocated to the monitoring control signal and the driving amplitude of the transmission data signal is reduced, the performance of the main signal is deteriorated. Furthermore, a configuration in which an optical variable attenuator capable of high-speed operation is arranged at an output of a modulator is described in NPL 2, and since each of the optical variable attenuators is individually driven by a transmission data signal and a monitoring control signal, there is a need for N variable optical attenuators, which results in an increase in cost.

In the optical access system 2000 illustrated in FIG. 8, a semiconductor optical amplifier (SOA) is used to superimpose the monitoring control signal on the intensity of the downstream WDM signal collectively. However, if the semiconductor optical amplifier is used in the saturation region of the gain in order to increase the output of the WDM signal, the main signal superimposed on the amplitude and the phase is largely distorted and the reception sensitivity is deteriorated. The lower limit value of the input optical signal intensity at which gain saturation occurs does not depend on the number of wavelengths of the WDM signal. Therefore, when the number of wavelengths used increases, the light intensity per wavelength cannot be increased in the configuration illustrated in FIG. 8. An erbium doped fiber amplifier (EDFA) is known as an optical amplifier capable of achieving high output without causing distortion in the WDM main signal. However, the EDFA has a slow response speed of the gain as compared with the SOA, and it is difficult to change the intensity of the pump light of the EDFA at the transmission bit rate of the monitoring control signal to superimpose the monitoring control signal on the WDM signal. As described in NPL 2, it is possible to superimpose the monitoring control signal using the variable optical attenuator capable of changing the attenuation amount at high speed, but there is then a problem that the number of optical components increases with use in combination with an EDFA.

As described above, the conventional technique has a problem that the deterioration of the downstream WDM signal cannot be suppressed with a simple configuration.

In view of the above circumstances, an object of the present invention is to provide a technique capable of suppressing deterioration of a downstream WDM signal with a simple configuration.

Solution to Problem

An aspect of the present invention includes a plurality of optical transmitting units that output optical signals with different wavelengths, a multiplexer that wavelength-multiplexes the plurality of the optical signals output from the plurality of optical transmitting units, and an amplifying unit that amplifies the wavelength-multiplexed optical signal, in which the plurality of optical transmitting units include a monitoring control signal application unit that adds a monitoring control signal to a constant current for driving a laser to generate a driving signal and applies the driving signal to the laser, a laser that outputs an optical signal in accordance with the driving signal applied to the monitoring control signal application unit, and a modulator that modulates the optical signal output from the laser with a main signal.

An aspect of the present invention is an optical access system including an optical transmitting device, and an optical receiving device, in which the optical transmitting device includes a plurality of optical transmitting units that output optical signals with different wavelengths, a multiplexer that wavelength-multiplexes the plurality of the optical signals output from the plurality of optical transmitting units, and an amplifying unit that amplifies the wavelength-multiplexed optical signal, the plurality of optical transmitting units include a monitoring control signal application unit that adds a monitoring control signal to a constant current for driving a laser to generate a driving signal and applies the driving signal to the laser, a laser that outputs an optical signal in accordance with the driving signal applied to the monitoring control signal application unit, and a modulator that modulates the optical signal output from the laser with a main signal, and the optical receiving device includes a photoelectric conversion unit that converts the optical signal into an electric signal, and a demodulation unit that demodulates the monitoring control signal based on the electric signal.

An aspect of the present invention is an optical transmitting method including a plurality of optical transmitting steps of outputting optical signals with different wavelengths, a multiplexing step of wavelength-multiplexing the plurality of optical signals output from the plurality of optical transmitting units, and an amplifying step of amplifying the wavelength-multiplexed optical signal, in which the plurality of optical transmitting steps include a monitoring control signal application step of adding a monitoring control signal to a constant current for driving a laser to generate a driving signal and applying the driving signal to the laser, and a modulation step of modulating an optical signal output from a laser that outputs an optical signal in accordance with the driving signal applied in the monitoring control signal application step with a main signal.

An aspect of the present invention is an optical transmitting method performed by an optical access system including an optical transmitting device and an optical receiving device, the method including a plurality of optical transmitting steps of outputting optical signals with different wavelengths using the optical transmitting device, a multiplexing step of wavelength-multiplexing the plurality of optical signals output from the plurality of optical transmitting units, and an amplifying step of amplifying the wavelength-multiplexed optical signal, the plurality of optical transmitting steps include a monitoring control signal application step of adding a monitoring control signal to a constant current for driving a laser to generate a driving signal and applying the driving signal to the laser, and a modulation step of modulating an optical signal output from a laser that outputs an optical signal in accordance with the driving signal applied in the monitoring control signal application step with a main signal, and the optical receiving device includes a photoelectric conversion step of converting the optical signal into an electric signal, and a demodulation step of demodulating the monitoring control signal based on the electric signal.

Advantageous Effects of Invention

According to the present invention, it is possible to suppress deterioration of the downstream WDM signal with a simple configuration.

DESCRIPTION OF EMBODIMENTS

The following describes an embodiment of the present invention with reference to the drawings.

First Embodiment

Figure 1:
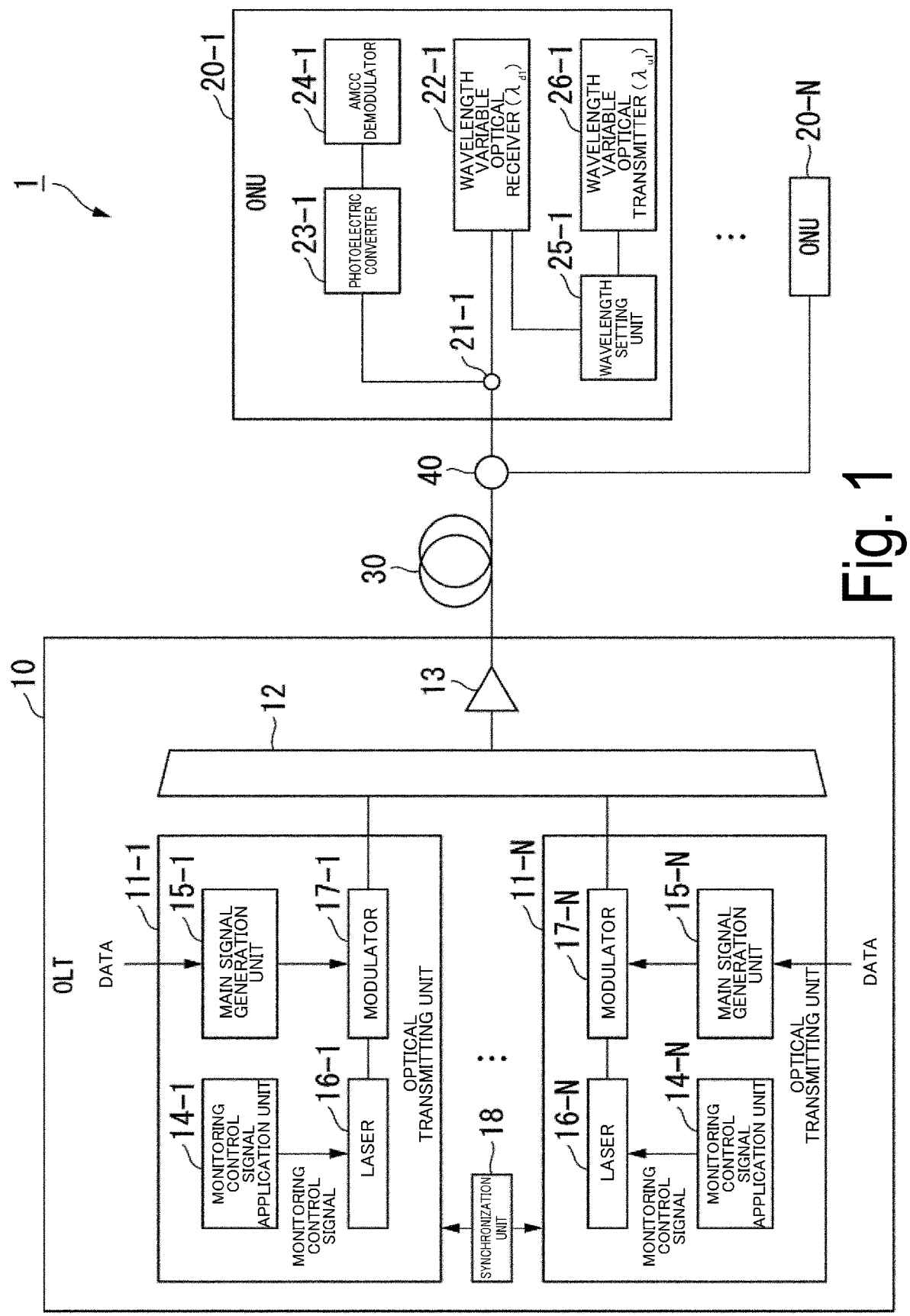
FIG. 1 is a diagram illustrating a configuration example of an optical access system according to a first embodiment.

FIG. 1 is a diagram illustrating a configuration example of an optical access system 1 according to a first embodiment. The optical access system 1 according to the present invention can be applied to any system in which at least a part of a transmission channel is shared by WDM. In the following description, a PON, which is a one-to-N network, will be described as an example of the optical access system 1 for simplification of the description.

The optical access system 1 includes an OLT 10 and a plurality of ONUs 20-1 to 20-N. The OLT 10 and the ONUs 20-1 to 20-N are connected via an optical fiber 30 and an optical splitter 40. The OLT 10 and the ONUs 20-1 to 20-N communicate with each other via the optical fiber 30 and the optical splitter 40. Also, in the following description, in a case where the ONUs 20-1 to 20-N are not particularly distinguished, they are described as the ONU 20. The direction from the ONU 20 to the OLT 10 is described as going up, and the direction from OLT 10 to ONU 20 is described as going down.

The OLT 10 uses WDM technology to transmit downlink WDM signals to each of the ONUs 20-1 to 20-N. The OLT 10 includes N optical transmitting units (plurality of optical transmitters) 11-1 to 11-N, a wavelength multiplexer (multiplexer) 12, an optical amplifier (amplifier) 13, and a synchronization unit 18.

The optical transmitting units 11-1 to 11-N generate optical signals having different wavelengths from each other. Each of the optical transmitting units 11-1 to 11-N is provided with monitoring control signal application units (monitoring control signal applicator) 14-1 to 14-N, main signal generation units 15-1 to 15-N, lasers 16-1 to 16-N, and modulators 17-1 to 17-N. Since the optical transmitting units 11-1 to 11-N have the same configuration, a specific configuration will be described by taking the optical transmitting unit 11-1 as an example.

The monitoring control signal application unit 14-1 generates a monitoring control signal (AMCC) including monitoring control information. The monitoring control signal application unit 14-1 adds the generated monitoring control signal to a constant current for driving the laser 16-1 to generate a driving signal. The monitoring control information includes information on "free wavelength" (hereinafter, referred to as "free wavelength information"). The monitoring control signal application units 14-1 to 14-N may utilize the monitoring control signal superimposed on the subcarrier or as a baseband signal. The monitoring control signal application unit 14-1 applies a driving signal to the laser 16-1 at the same timing as that of the other monitoring control signal application unit 14 in accordance with the synchronizing signal supplied from the synchronization unit 18.

The main signal generation unit 15-1 generates a main signal using data of a transmission object supplied from the outside.

The laser 16-1 outputs an optical signal corresponding to the driving signal applied from the monitoring control signal application unit 14-1. Using the driving signal applied from the monitoring control signal application UNIT 14-1, the monitoring control signal is superimposed on the amplitude of the optical signal output from the laser 16-1. The lasers 16-1 to 16-N output the optical signals having different wavelengths.

The modulator 17-1 amplitude-modulates the optical signal output from the laser 16-1 with the input transmission data.

The optical signal modulated by the optical transmitters 11-1 to 11-N is multiplexed by the wavelength multiplexer 12 to become the downstream WDM signal.

The monitoring control signal superimposed on the currents applied to the plurality of lasers 16-1 to 16-N outputting different wavelengths is the same signal. The plurality of monitoring control signal application units 14-1 to 14-N are synchronized with each other and drive the lasers 16-1 to 16-N at the same timing. Therefore, a plurality of optical signals output from each of the lasers 16-1 to 16-N and modulated are input to a multiplexer/demultiplexer 12 at substantially the same timing.

The optical amplifier 13 amplifies the downstream WDM signal. The optical amplifier 13 is, for example, an EDFA. The downstream WDM signal amplified by the optical amplifier 13 is transmitted to the ONUS 20-1 to 20-N via the optical fiber 30 and the optical splitter 40.

The synchronization unit 18 synchronizes the monitoring control signal application units 14-1 to 14-N so that the driving signal application timings are the same.

The ONUs 20-1 to 20-N include optical branching devices 21-1 to 21-N, wavelength variable optical receivers 22-1 to 22-N, photoelectric converters 23-1 to 23-N, AMCC demodulators (demodulator) 24-1 to 24-N, wavelength setting units 25-1 to 25-N, and wavelength variable optical transmitters 26-1 to 26-N. Since the ONUs 20-1 to 20-N have the same configuration, a specific configuration will be described with reference to the ONU 20-1 as an example.

The optical branching device 21-1 branches the downstream WDM signal inputted to the ONU 20-1 into two channels. The downstream WDM signal branched to the first channel by the optical branching device 21-1 is inputted to the wavelength variable optical receiver 22-1. A wavelength variable optical filter is mounted on the wavelength variable optical receiver 22-1 and when the ONU 20-1 is connected to the optical access system 1, its transmission wavelength is swept. When detecting the downstream wavelength, the ONU 20-1 acquires free wavelength information of a pair of the upstream and downstream directions embedded in the monitoring control signal. The wavelength setting unit 25-1 sets the transmission wavelength of the wavelength variable optical filter and the output wavelength of the wavelength variable optical transmitter 26-1 to the free wavelength based on the acquired free wavelength information. The wavelength setting unit 25-1 refers to, for example, free wavelength information in the downstream direction and sets an unused wavelength as a transmission wavelength of the wavelength variable optical filter. The wavelength setting unit 25-1 refers to, for example, free wavelength information in the upstream direction, and sets an unused wavelength as an output wavelength of the wavelength variable optical transmitter 26-1. The wavelength variable optical transmitter 26-1 transmits the optical signal having the wavelength set in the setting unit 25-1 to the OLT 10.

The downstream WDM signal branched to the second channel by the optical branching device 21-1 is input to the photoelectric converter 23-1. The photoelectric converter 23-1 converts the input downstream WDM signal into an electric signal. The AMCC demodulator 24-1 receives the monitoring control signal by demodulating the electric signal. Although all the downstream WDM signals are input to the photoelectric converter 23-1, the monitoring control signal can be received as long as the transmission bit rate of the monitoring control signal is sufficiently slower than the transmission bit rate of the main signal.

Figure 2:
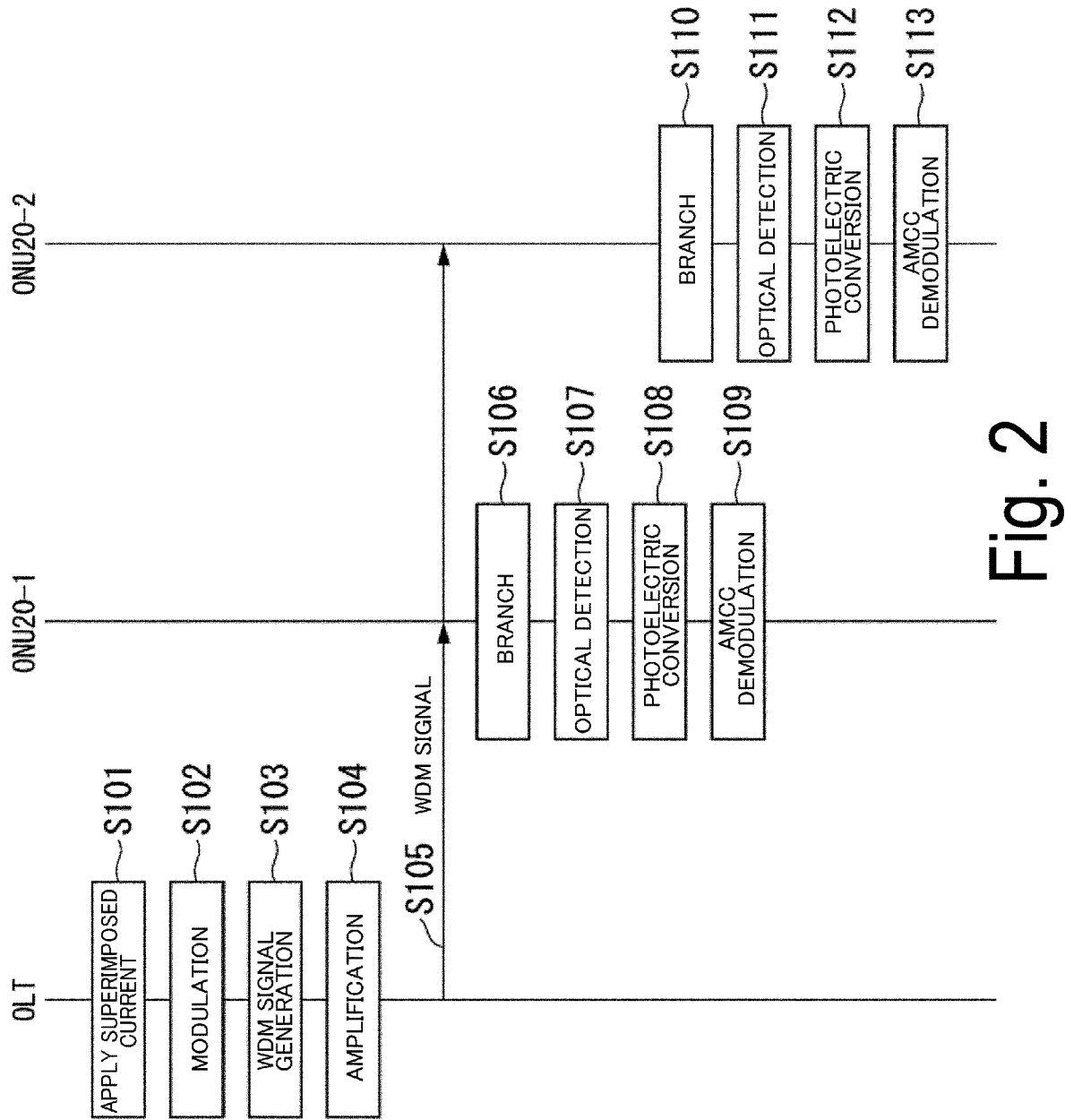
FIG. 2 is a sequence diagram illustrating a flow of processing of the optical access system according to the first embodiment.

FIG. 2 is a sequence diagram illustrating a flow of processing of the optical access system according to the first embodiment. In the processing of FIG. 2, a case where two ONU 20s (the ONU 20-1 and 20-2) are provided in the optical access system 1 will be described as an example.

The monitoring control signal application units 14-1 to 14-N provided in each of the optical transmitting units 11-1 to 11-N of the OLT 10 applies a driving signal to the lasers 16-1 to 16-N at the same timing synchronized by the synchronization unit 18 (step S101). The lasers 16-1 to 16-N each output an optical signal having a wavelength corresponding to the applied drive signal. The modulators 17-1 to 17-N amplitude-modulate the optical signal output from the lasers 16-1 to 16-N with the input transmission data (step S102).

The wavelength multiplexer 12 multiplexes the modulated optical signals outputted from each of the optical transmitting units 11-1 to 11-N and generates the downstream WDM signal (step S103). The generated downstream WDM signal is output to the optical amplifier 13. The optical amplifier 13 amplifies the input downstream WDM signal (step S104). The optical amplifier 13 outputs the amplified downstream WDM signal to the optical fiber 30.

The downstream WDM signal outputted to the optical fiber 30 is branched by the optical splitter 40 and inputted to each of the ONUs 20-1 to 20-N.

The downstream WDM signal input to the ONU 20-1 is branched by the optical branching device 21-1 (step S105). The downstream WDM signal branched to the first channel by the optical branching device 21-1 is inputted to the wavelength variable optical receiver 22-1, and the downstream WDM signal branched to the second channel by the optical branching device 21-1 is inputted to the photoelectric converter 23-1.

The wavelength variable optical receiver 22-1 performs optical detection of the inputted downstream WDM signal with the set wavelength (step S106). The photoelectric converter 23-1 converts the input downstream WDM signal into an electric signal (step S107). The photoelectric converter 23-1 outputs the electric signal to the AMCC demodulator 24-1. The AMCC demodulator 24-1 receives the monitoring control signal by demodulating the electric signal output from the photoelectric converter 23-1 (step S108).

The downstream WDM signal input to the ONU 20-2 is branched by the optical branching device 21-2 (step S109). A part of the downstream WDM signal branched by the optical branching device 21-2 is inputted to the wavelength variable optical receiver 22-2, and the other downstream WDM signal branched by the optical branching device 21-2 is inputted to the photoelectric converter 23-2.

The wavelength variable optical receiver 22-2 performs optical detection of the input downstream WDM signal with the set wavelength (step S110). The photoelectric converter 23-2 converts the input downstream WDM signal into an electric signal (step S111). The photoelectric converter 23-2 outputs the electric signal to the AMCC demodulator 24-2. The AMCC demodulator 24-2 receives the monitoring control signal by demodulating the electric signal outputted from the photoelectric converter 23-2 (step S112).

Figure 3:
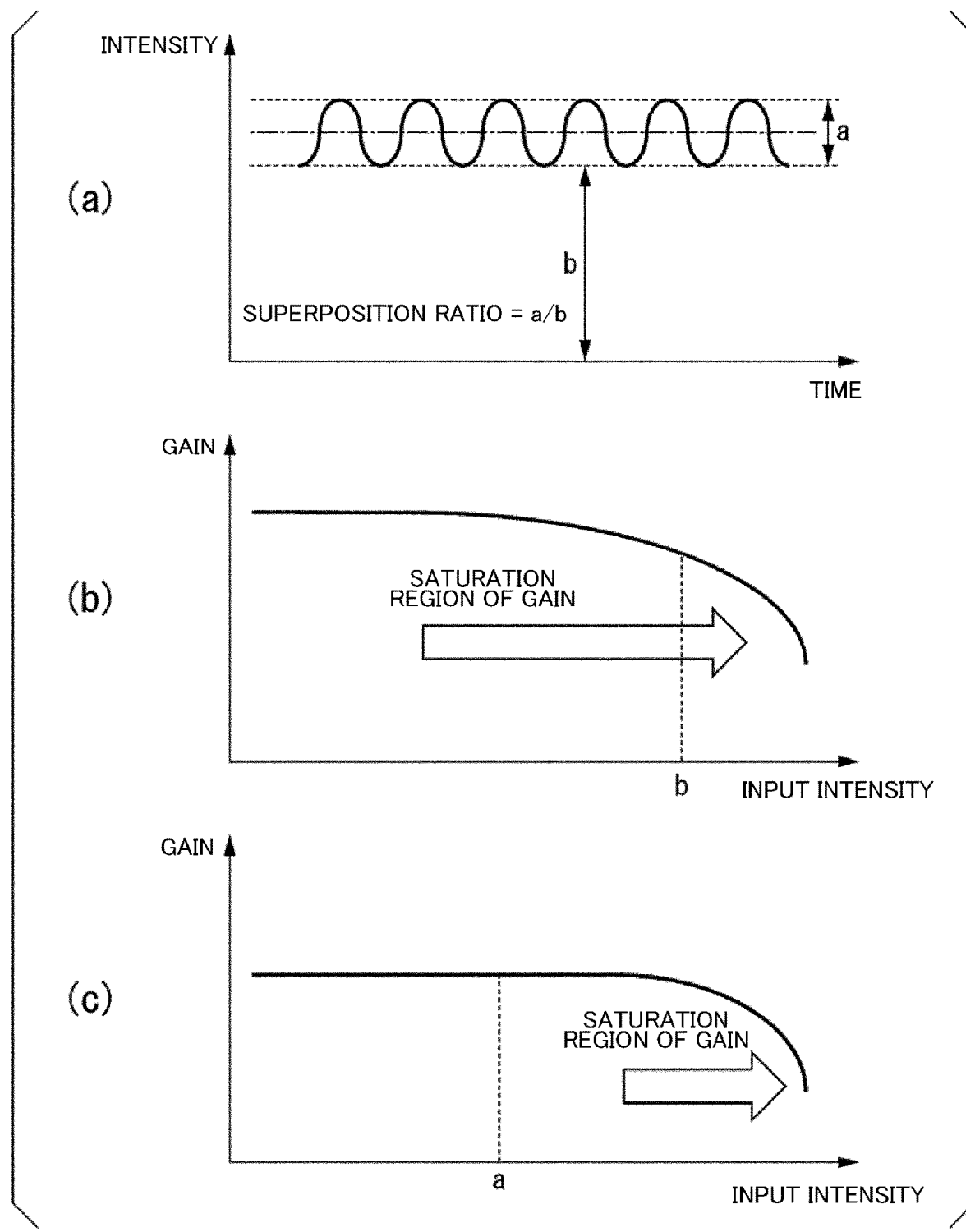
FIG. 3 is an explanatory diagram relating to signal performance degradation of a monitoring control signal in a case where a superposition ratio of the monitoring control signal to a main signal is small.
Figure 4:
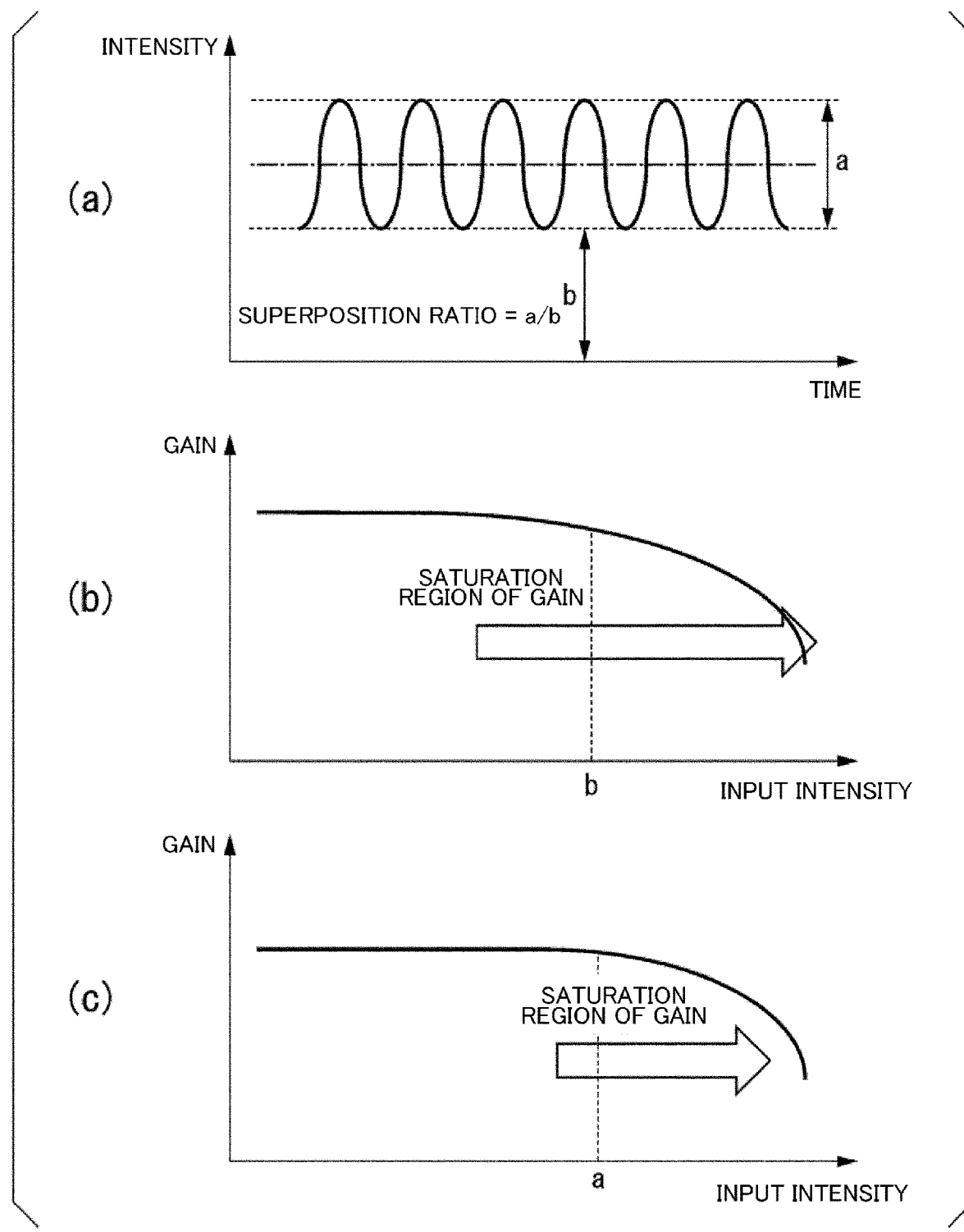
FIG. 4 is an explanatory diagram relating to signal performance degradation of the monitoring control signal in a case where the superposition ratio of the monitoring control signal is great.

Here, the case where the optical amplifier 13 is an EDFA will be described. When in the EDFA, the response speed of the gain is slow, the bit rate of the monitoring control signal is equal to the response speed of the gain, and the EDFA is operated in a saturation region of the gain, there is a concern that the signal performance of the monitoring control signal is deteriorated due to the transient response of the EDFA. The signal performance deterioration of the monitoring control signal will be described with reference to FIGS. 3 and 4. FIG. 3 is an explanatory view illustrating the deterioration of the signal performance of the monitoring control signal when the superposition ratio of the monitoring control signal to the main signal is small. FIG. 4 is an explanatory view illustrating the deterioration of the signal performance of the monitoring control signal when the superposition ratio of the monitoring control signal is great.

As illustrated in FIG. 3, in a case where the superposition ratio of the monitoring control signal to the main signal is small (FIG. 3(a)), even if the optical signal is input to the saturation region of the gain of the EDFA, since the gain of the EDFA is fixed (gain clamped) by the gain of the main signal occupying most of the input light intensity, and the gain received by the AMCC as a weak signal is not constant in the amplitude range, the signal characteristics of the monitoring control signal do not deteriorate due to the transient response.

On the other hand, in a case where the superposition ratio of the monitoring control signal is great (see FIG. 4(a)), the gain of the EDFA changes according to the amplitude range of the monitoring control signal, and the signal characteristic of the monitoring control signal may be deteriorated due to the transient response.

Figure 5:
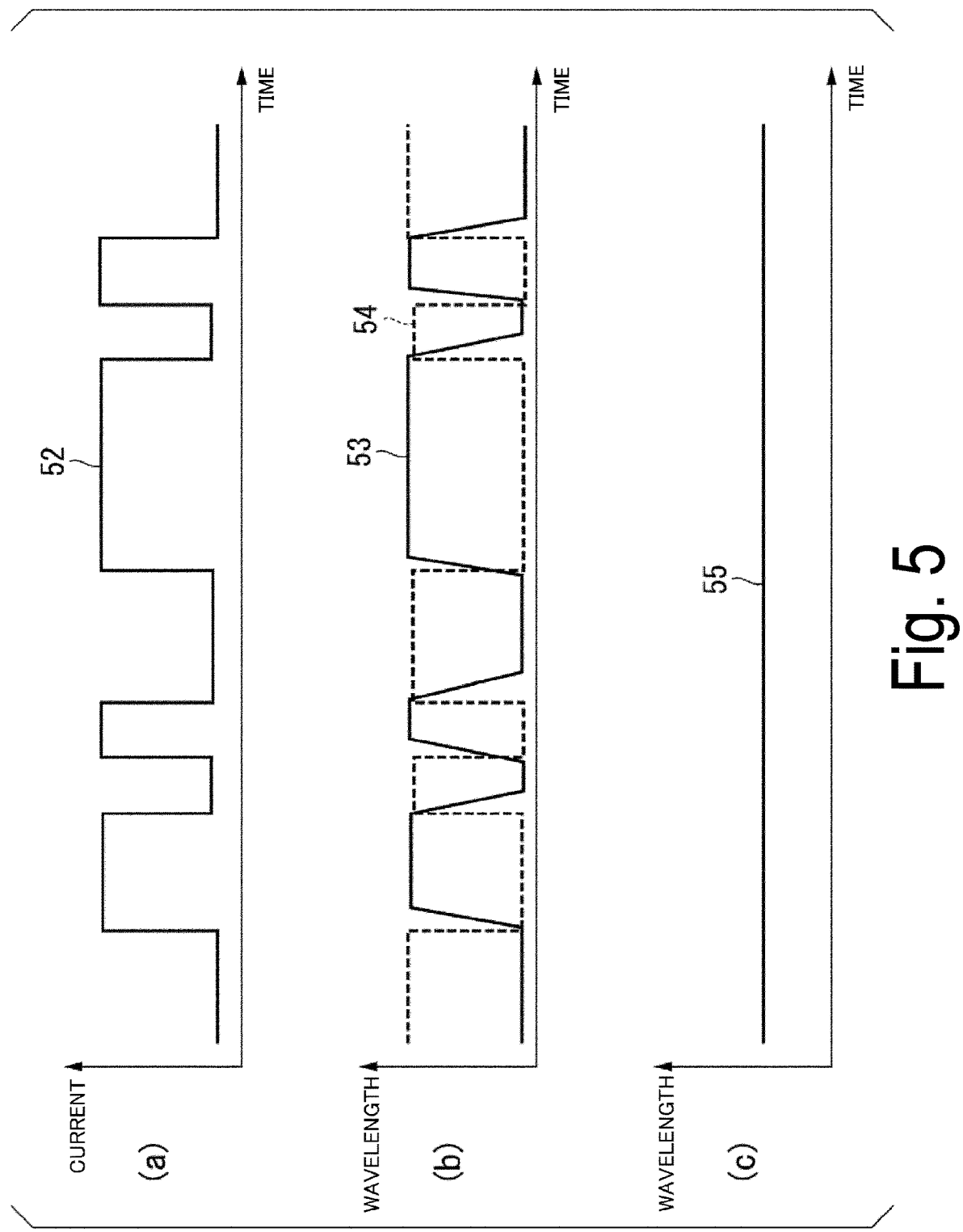
FIG. 5 is an explanatory diagram of a driving current applied to a laser.

FIG. 5 is an explanatory diagram of the driving current applied to the laser 16.

FIG. 5(a) illustrates an example of the driving current 52 of the laser 16. When the driving current 52 of the laser 16 is amplitude-modulated (baseband modulation or subcarrier modulation) by a weak monitoring control signal after setting the bias point high, the wavelength of the laser 16 is changed with a short wavelength in an on state and a long wavelength in an off state slightly by a change in refractive index accompanying a change in carrier density of a semiconductor (FIG. 5(b)). This wavelength change causes performance degradation of the received signal when performing coherent detection of the main signal.

The reference numeral 53 in FIG. 5(b) represents the wavelength shift of the thermal effect, and the reference numeral 54 represents the wavelength shift of the carrier effect. The reference numeral 55 in FIG. 5(c) represents an oscillation wavelength shift. In a case where the monitoring control signal is a low-speed signal of the same degree as the speed of the thermal change of the semiconductor, the temperature of the semiconductor follows the on/off state even if the temperature is adjusted by using a Peltier element or a thermistor. In the on-state, the driving current of the semiconductor increases, and the applied heat causes a refractive index change opposite to a change in carrier density, and the wavelength changes to the long wave side. On the other hand, when the state is changed from on to off, the driving current of the semiconductor is reduced to reduce heat, thereby causing a refractive index change opposite to that of the carrier density change, and the wavelength changes to the short wavelength side. As a result, it is expected that the change in the refractive index due to the change in the carrier density and the change in the refractive index due to the change in the heat is canceled, and the change in the wavelength of the semiconductor laser due to the weak signal modulation is suppressed.

The above-described effect can be expected when a semiconductor laser having a structure in which heat generated by a driving current hardly escapes is used, and the ridge waveguide type and the high Mesa waveguide type are used as the structure of such a semiconductor laser.

According to the optical access system 1 configured as described above, it is possible to suppress deterioration of the downstream WDM signal with a simple configuration. More specifically, in the optical access system 1, the monitoring control signals are superimposed by using the lasers 16-1 to 16-N, which are indispensable components of the optical transmission units 11-1 to 11-N and high output is possible without degrading the downstream WDM signal with a simple configuration in which the optical amplifier 13 is arranged after the WDM signal is generated by the multiplexer/demultiplexer 12.

In the OLT 10 in the optical access system 1, the main signal (transmission data) and the monitoring control signal are not added, but individually applied to a modulator 15 and the laser 16. Thus, the amplitude range of the electric signal for driving the modulator 15 can be allocated to the all main signals. Therefore, performance deterioration of the main signal can be suppressed.

Although a deviation occurs in the time position of the monitoring control signal individually superposed for each wavelength at the time of reception due to the influence of wavelength dispersion of the optical fiber 30, the monitoring control signal is sufficiently slow as compared with the main signal. Therefore, if the timing is adjusted by the OLT 10, it is possible to suppress the deterioration of the reception performance of the monitoring control signal due to the time position shift.

Second Embodiment

Figure 6:
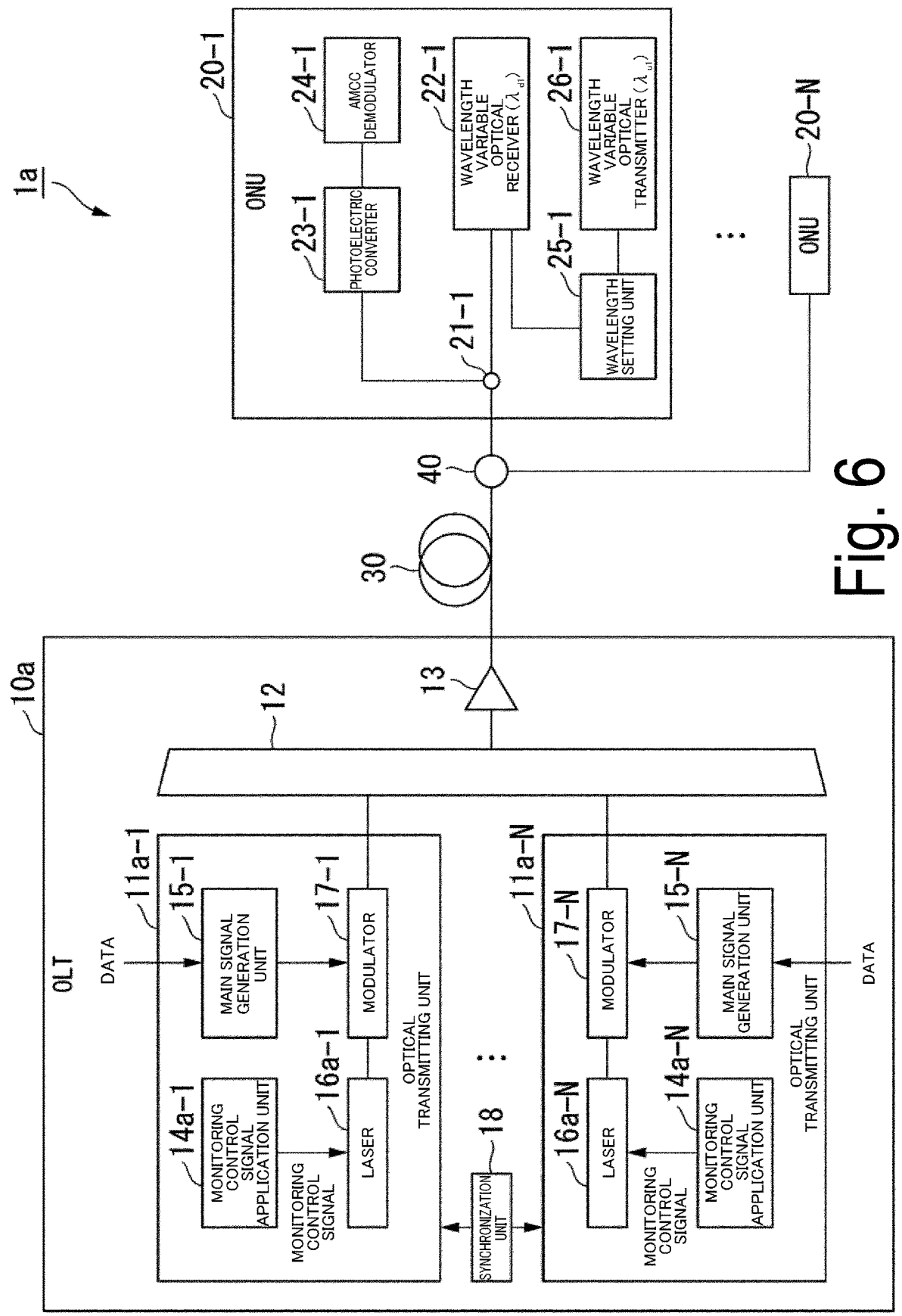
FIG. 6 is a diagram illustrating a configuration example of an optical access system according to a second embodiment.
Figure 7:
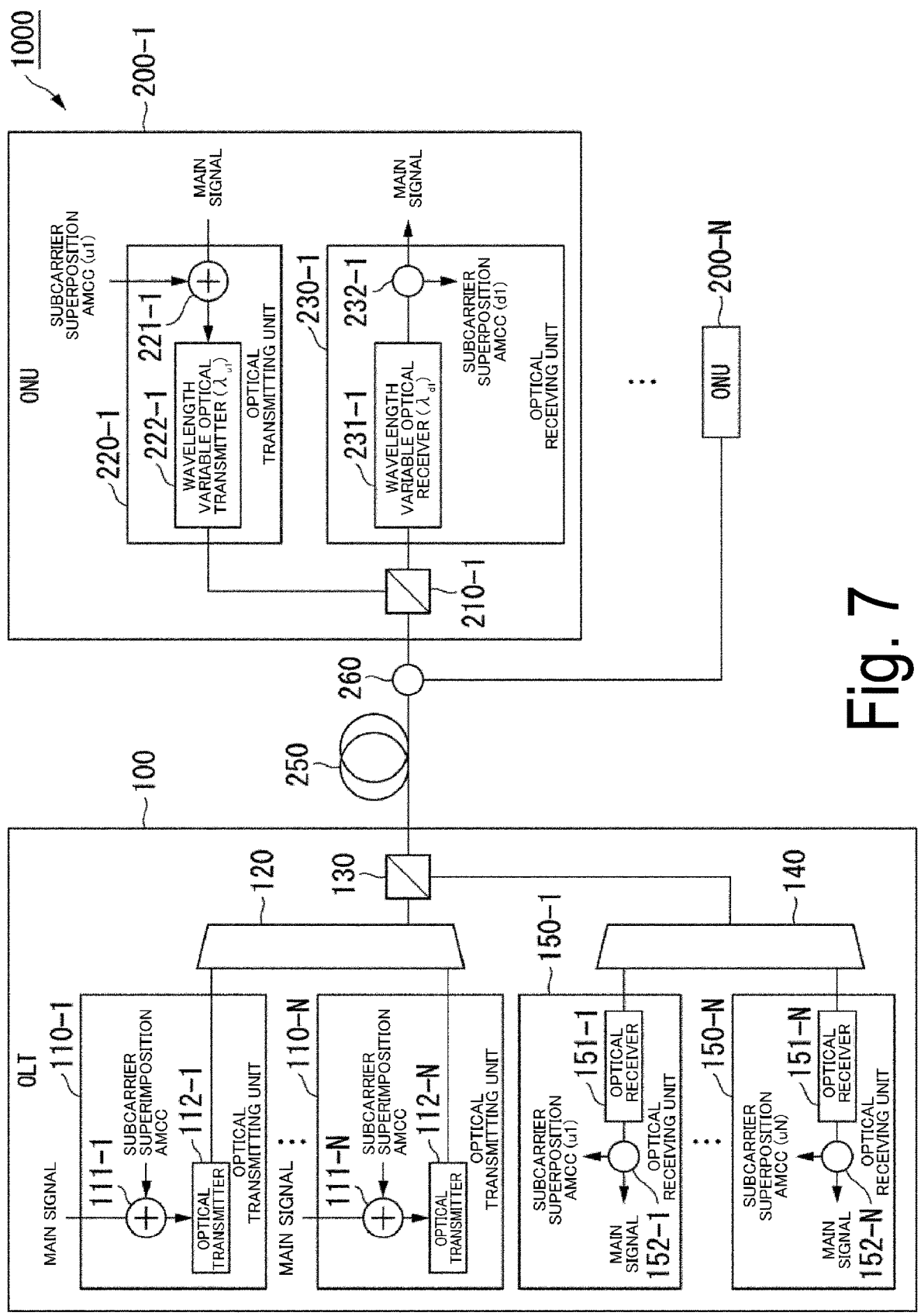
FIG. 7 is a diagram illustrating a configuration example of the conventional optical access system (No. 1).
Figure 8:
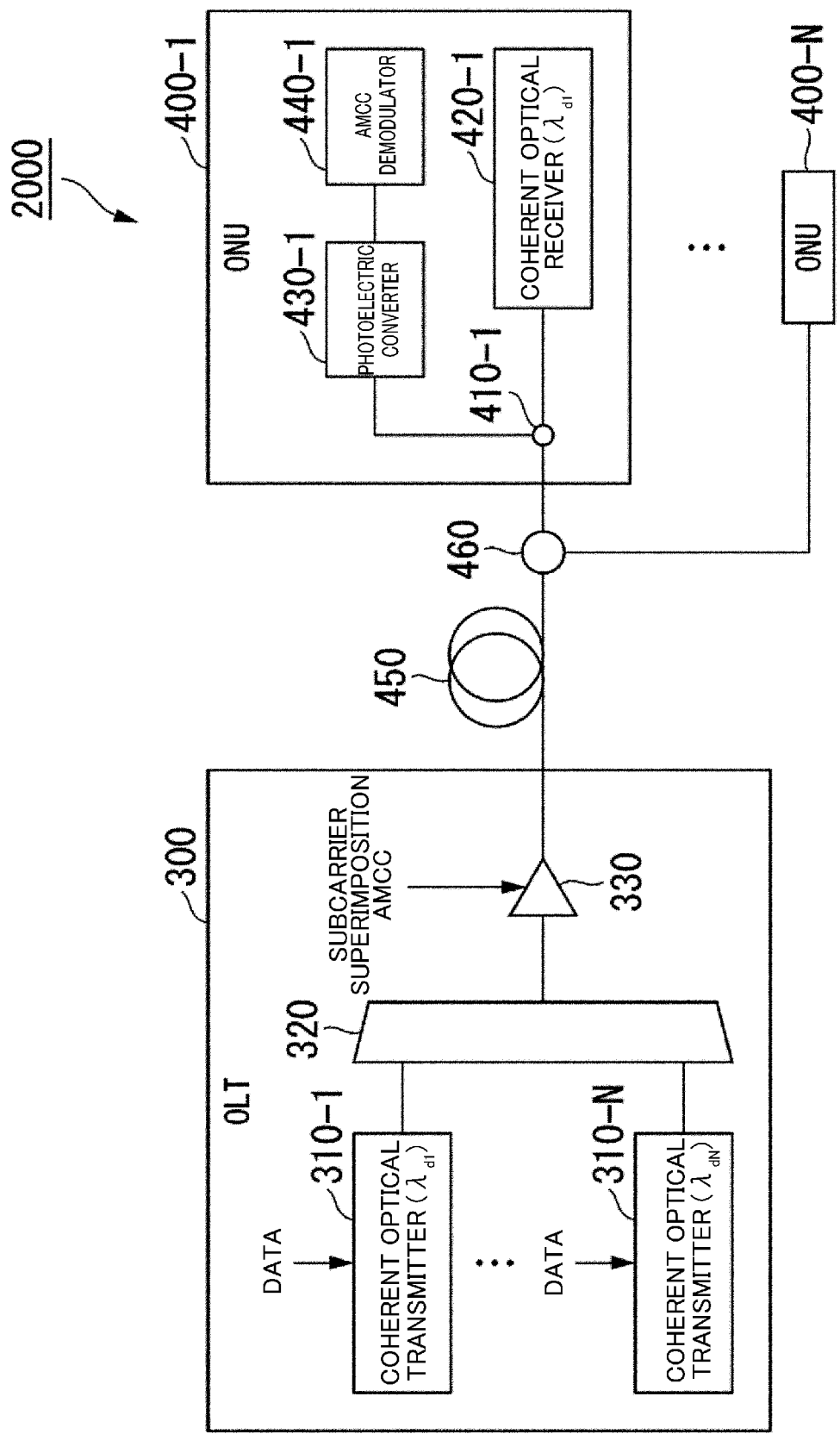
FIG. 8 is a diagram illustrating a configuration example of the conventional optical access system (No. 2).

FIG. 6 is a diagram illustrating a configuration example of an optical access system 1a according to a second embodiment. The optical access system 1a in the present invention can be applied as long as it is a system in which at least a part of a transmission channel is shared by WDM. In the following description, the PON, which is a one-to-N network, will be described as an example of the optical access system 1a for simplifying the description.

The optical access system 1a is provided with an OLT 10a and a plurality of ONUs 20-1 to 20-N. The OLT 10a and the ONUs 20-1 to 20-N are connected via the optical fiber 30 and the optical splitter 40. The OLT 10a and the ONUs 20-1 to 20-N communicate with each other via the optical fiber 30 and the optical splitter 40.

In the optical access system 1a, the point different from the optical access system 1 in the first embodiment is that the monitoring control signal is superimposed on the subcarrier. That is, in the optical access system 1, there are both patterns in the case where the monitoring control signal is used while being superimposed on the subcarrier and in the case where the monitoring control signal is used as a baseband signal, but the configuration is different in that the optical access system 1a is limited to the case where the monitoring control signal is used while being superimposed on the subcarrier.

The OLT 10a includes N optical transmitting units 11a-1 to 11a-N, the wavelength multiplexer 12, the optical amplifier 13, and the synchronization unit 18. The optical transmitting units 11a-1 to 11a-N generate optical signals having different wavelengths from each other. Each of the optical transmission units 11a-1 to 11a-N include the monitoring control signal application units 14a-1 to 14a-N, main signal generation units 15-1 to 15-N, lasers 16a-1 to 16a-N, and modulators 17-1 to 17-N, respectively. The OLT 10a differs in configuration in that the OLT 10a includes the monitoring control signal application units 14a-1 to 14a-N and the lasers 16a-1 to 16a-N instead of the monitoring control signal application units 14-1 to 14-N and the lasers 16-1 to 16-N

The monitoring control signal application units 14a-1 to 14a-N in the optical transmitters 11a-1 to 11a-N included in the OLT 10a are used by superimposing the monitoring control signal on the subcarrier. Then, the monitoring control signal application units 14a-1 to 14a-N apply a driving signal obtained by superimposing a monitoring control signal on a subcarrier to the lasers 16a-1 to 16a-N at the same timing synchronized by the synchronization unit 18.

When optical amplification is performed by the optical amplifier 13, the signal characteristics of the monitoring control signal may be deteriorated as illustrated in FIG. 4. Therefore, as in the second embodiment, by subcarrier-modulating the monitoring control signal and setting the signal band so as to exceed the response speed of the gain of the optical amplifier 13, the problem as illustrated in FIG. 4 can be avoided by avoiding the exceeding the response speed.

Some of the functions of the OLTs 10, 10a and ONU 20 in the above-described embodiment may be realized by a computer. In such a case, the program to realize their functions may be recorded on a computer-readable recording medium, and the program recorded on the recording medium may be read and executed by the computer system. It is assumed that the "computer system" as used herein includes an OS and hardware such as peripheral devices. In addition, the "computer-readable recording medium" refers to a portable medium such as a flexible disk, a magneto-optical disk, a ROM, or a CD-ROM, or a storage apparatus such as a hard disk that is built into the computer system. Furthermore, the "computer-readable recording medium" may also include a recording medium that dynamically holds a program for a short period of time such as a communication line when the program is to be transmitted via a network such as the Internet or a communication line such as a telephone line, as well as a recording medium that holds a program for a certain period of time such as a volatile memory inside a server or a computer system serving as a client in this case. Also, the above-described program may be a program for achieving some of the aforementioned functions, a program that can realize the aforementioned functions in combination with a program that has already been recorded in the computer system, or a program that is achieved using a programmable logic device such as a field programmable gate array (FPGA).

Although the embodiments of the present invention have been described in detail with reference to the drawings, specific configurations are not limited to these embodiments, and designs and the like within a range that does not deviating from the gist of the present invention are also included.

INDUSTRIAL APPLICABILITY

The present invention can be applied to an optical access system using WDM.

REFERENCE SIGNS LIST

10, 10a: OLT

20-1 to 20-N: ONU

11-1 to 11-N and 11a-1 to 11a-N: Optical transmitting unit

12: Multiplexer/demultiplexer

13: Optical amplifier

16-1 to 16-N and 14a-1 to 14a-N: Laser

17-1 to 17-N: Modulator

21-1 to 21-N: Optical branching device

22-1 to 22-N: Wavelength variable optical receiver

23-1 to 23-N: Photoelectric converter

24-1 to 24-N: AMCC demodulator

25-1 to 25-N: Wavelength setting unit

26-1 to 26-N: Wavelength variable optical transmitter

The invention claimed is:

1. An optical transmitting device comprising:
a plurality of optical transmitters configured to output optical signals with different wavelengths;
a multiplexer configured to wavelength-multiplex the plurality of the optical signals output from the plurality of optical transmitters; and
an amplifier configured to amplify the wavelength-multiplexed optical signal,
wherein
the plurality of optical transmitters each include
a monitoring control signal applicator configured to add a monitoring control signal to a constant current for driving a laser to generate a driving signal and apply the driving signal to the laser, the monitoring control signal being a same signal at the plurality of optical transmitters and including information on free wavelength,
a laser configured to output an optical signal in accordance with the driving signal applied to the monitoring control signal applicator, and
a modulator that modulates the optical signal output from the laser with a main signal,
wherein the plurality of monitoring control signal applicators apply the driving signal at the same timing to different lasers in synchronization with each other,
the amplifier is an Erbium Doped Fiber Amplifier (EDFA) and is operated in a saturation region of a gain.

2. The optical transmitting device according to claim 1, wherein the monitoring control signal applicator uses the monitoring control signal superimposed on a subcarrier or uses the monitoring control signal as a baseband signal.

3. The optical transmitting device according to claim 1, wherein the laser has a structure of ridge waveguide type or a high Mesa waveguide type.

4. An optical access system comprising:
an optical transmitting device; and
an optical receiving device, wherein
the optical transmitting device includes
a plurality of optical transmitters configured to output optical signals with different wavelengths,
a multiplexer configured to wavelength-multiplex the plurality of the optical signals output from the plurality of optical transmitters, and
an amplifier configured to amplify the wavelength-multiplexed optical signal,
wherein
the plurality of optical transmitters each include
a monitoring control signal applicator configured to add a monitoring control signal to a constant current for driving a laser to generate a driving signal and apply the driving signal to the laser, the monitoring control signal being a same signal at the plurality of optical transmitters and including information on free wavelength,
a laser configured to output an optical signal in accordance with the driving signal applied to the monitoring control signal applicator, and
a modulator configured to modulate the optical signal output from the laser with a main signal, and
wherein
the optical receiving device includes
a photoelectric converter configured to convert the optical signal into an electric signal, and
a demodulator configured to demodulate the monitoring control signal based on the electric signal,
wherein the plurality of monitoring control signal applicators apply the driving signal at the same timing to different lasers in synchronization with each other,
the amplifier is an Erbium Doped Fiber Amplifier (EDFA) and is operated in a saturation region of a gain.

5. An optical transmitting method comprising:
outputting optical signals with different wavelengths which a plurality of optical transmitters are output;
wavelength-multiplexing the plurality of optical signals output from the plurality of optical transmitters; and
amplifying the wavelength-multiplexed optical signal,
wherein
the outputting include
adding a monitoring control signal to a constant current for driving a laser to generate a driving signal and applying the driving signal to the laser, the monitoring control signal being a same signal at the plurality of optical transmitters and including information on free wavelength, and
modulating an optical signal output from a laser that outputs an optical signal in accordance with the driving signal applied in the adding with a main signal,
wherein a applying the driving signal at the same timing to different lasers in synchronization with each other,
an amplifier utilized in the amplifying is an Erbium Doped Fiber Amplifier (EDFA) and is operated in a saturation region of a gain.

6. An optical transmitting device comprising:
a plurality of optical transmitters configured to output optical signals with different wavelengths;
a multiplexer configured to wavelength-multiplex the plurality of the optical signals output from the plurality of optical transmitters; and
an amplifier configured to amplify the wavelength-multiplexed optical signal,
wherein
the plurality of optical transmitters each include
a monitoring control signal applicator configured to add a monitoring control signal to a constant current for driving a laser to generate a driving signal and apply the driving signal to the laser, the monitoring control signal being a same signal at the plurality of optical transmitters and including information on free wavelength,
a laser configured to output an optical signal in accordance with the driving signal applied to the monitoring control signal applicator, and
a modulator that modulates the optical signal output from the laser with a main signal,
wherein the optical transmitting device further comprises a synchronizer synchronizes the plurality of monitoring control signal applicators,
wherein the plurality of monitoring control signal applicators apply the driving signal at the same timing to different lasers in accordance with synchronization signals for synchronizing an application timing of the driving signal supplied from the synchronizer,
the amplifier is an Erbium Doped Fiber Amplifier (EDFA) and is operated in a saturation region of a gain.

7. An optical access system comprising:
an optical transmitting device; and
an optical receiving device, wherein
the optical transmitting device includes
- a plurality of optical transmitters configured to output optical signals with different wavelengths,
- a multiplexer configured to wavelength-multiplex the plurality of the optical signals output from the plurality of optical transmitters, and
- an amplifier configured to amplify the wavelength-multiplexed optical signal, wherein
the plurality of optical transmitters each include
- a monitoring control signal applicator configured to add a monitoring control signal to a constant current for driving a laser to generate a driving signal and apply the driving signal to the laser, the monitoring control signal being a same signal at the plurality of optical transmitters and including information on free wavelength,
- a laser configured to output an optical signal in accordance with the driving signal applied to the monitoring control signal applicator, and
- a modulator configured to modulate the optical signal output from the laser with a main signal, and wherein
the optical receiving device includes
- a photoelectric converter configured to convert the optical signal into an electric signal, and
- a demodulator configured to demodulate the monitoring control signal based on the electric signal,
- wherein the optical transmitting device further comprises a synchronizer synchronizes the plurality of monitoring control signal applicators,
- wherein the plurality of monitoring control signal applicators apply the driving signal at the same timing to different lasers in accordance with synchronization signals for synchronizing an application timing of the driving signal supplied from the synchronizer,
- the amplifier is an Erbium Doped Fiber Amplifier (EDFA) and is operated in a saturation region of a gain.

8. An optical transmitting method comprising:
outputting optical signals with different wavelengths which a plurality of optical transmitters are output;
wavelength-multiplexing the plurality of optical signals output from the plurality of optical transmitters; and
amplifying the wavelength-multiplexed optical signal,
wherein
the outputting include
- adding a monitoring control signal to a constant current for driving a laser to generate a driving signal and applying the driving signal to the laser, the monitoring control signal being a same signal at the plurality of optical transmitters and including information on free wavelength, and
- modulating an optical signal output from a laser that outputs an optical signal in accordance with the driving signal applied in the adding with a main signal,
- wherein the optical transmitting method further comprises a synchronizing a plurality of monitoring control signal applicators,
- wherein applying the driving signal at the same timing to different lasers in accordance with synchronization signals for synchronizing an application timing of the driving signal supplied from the synchronizing,
- an amplifier utilized in the amplifying is an Erbium Doped Fiber Amplifier (EDFA) and is operated in a saturation region of a gain.

* * * * *